(12) United States Patent
Zhang et al.

(10) Patent No.: US 10,685,559 B2
(45) Date of Patent: Jun. 16, 2020

(54) BLUETOOTH REMOTE CONTROLLER

(71) Applicant: SHENZHEN JBT SMART LIGHTING CO., LTD., Shenzhen, Guangdong (CN)

(72) Inventors: Wenbin Zhang, Guangdong (CN); Huiping Chen, Guangdong (CN); Guangli Guo, Guangdong (CN); Xin Huang, Guangdong (CN)

(73) Assignee: SHENZHEN JBT SMART LIGHTING CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/766,694

(22) PCT Filed: May 22, 2017

(86) PCT No.: PCT/CN2017/085316
§ 371 (c)(1),
(2) Date: Apr. 6, 2018

(87) PCT Pub. No.: WO2018/014647
PCT Pub. Date: Jan. 25, 2018

(65) Prior Publication Data
US 2018/0301024 A1    Oct. 18, 2018

(30) Foreign Application Priority Data

Jul. 19, 2016    (CN) .................... 2016 2 0766891 U (51) Int. Cl.
*G08C 17/02*    (2006.01)
*H05B 47/19*    (2020.01)

(52) U.S. Cl.
CPC ............ *G08C 17/02* (2013.01); *H05B 47/19* (2020.01)

(58) Field of Classification Search
CPC ............................. G08C 17/02; H05B 37/0272
See application file for complete search history.

(56) References Cited

U.S. PATENT DOCUMENTS

| 5,537,106 A | * | 7/1996 | Mitsuhashi | .......... | G04G 15/006 340/12.22 |
| 2008/0259590 A1 | * | 10/2008 | De Goederen-Oei | ....................... | G06F 3/04847 362/85 |

(Continued)

FOREIGN PATENT DOCUMENTS

| CN | 202873155 U | 4/2013 |
| CN | 203279244 U | 11/2013 |

(Continued)

OTHER PUBLICATIONS

Machine Translation CN 202873155U.*

(Continued)

*Primary Examiner* — Nabil H Syed
(74) *Attorney, Agent, or Firm* — Hamre, Schumann, Mueller & Larson, P.C.

(57) ABSTRACT

A Bluetooth remote controller is disclosed in the present disclosure, comprising a remote controller housing which is provided with a plurality of openings, a circuit board disposed inside the remote controller housing, a plurality of keys disposed on the plurality of openings, a control unit disposed on the circuit board; a key circuit electrically connected to the control unit and disposed on the circuit board and abutting on the plurality of keys, a antenna for receiving a remote control signal of Bluetooth, electrically connected to the control unit and disposed on the circuit board. The beneficial effects of the implementation of the present disclosure is that achieving functions such as the remote adjusting of brightness, remote adjusting of color, timing, colors changing along with music and setting pro- (Continued)

files through Bluetooth wireless control technology to facilitate people's life and increase the diversity and delight of intelligent home lighting.

20 Claims, 7 Drawing Sheets

(56) References Cited

U.S. PATENT DOCUMENTS

| | | | | |
|---|---|---|---|---|
| 2013/0293361 | A1* | 11/2013 | Posa | G05B 15/02 340/12.28 |
| 2015/0137699 | A1 | 5/2015 | Killo et al. | |

FOREIGN PATENT DOCUMENTS

| | | |
|---|---|---|
| CN | 204168530 U | 2/2015 |
| CN | 204592983 | 8/2015 |
| CN | 204611558 | 9/2015 |
| CN | 204994012 | 1/2016 |
| CN | 205959391 U | 2/2017 |
| EP | 3367753 | 8/2018 |
| WO | 2015049412 | 4/2015 |
| WO | 2017206638 | 12/2017 |
| WO | 2017206639 | 12/2017 |
| WO | 2017206640 | 12/2017 |
| WO | 2017206641 | 12/2017 |
| WO | 2017206737 | 12/2017 |

OTHER PUBLICATIONS

Machine Translation CN 20327924U.*
RC-Lighthouse (44 Key IR Remote Control User Manual) (Year: 2015).*
International Search Report issued for International Patent Application No. PCT/CN2017/085316, dated Aug. 2, 2017, 6 pages including English translation.
Extended European Search Report issued for European Patent Application No. 17805683.4, dated Dec. 4, 2018, 11 pages.

* cited by examiner

BLUETOOTH REMOTE CONTROLLER

TECHNICAL FIELD

The present disclosure relates to the technical field of remote BLUETOOTH (hereinafter "Bluetooth") control technology, and more particularly, to a Bluetooth remote controller.

BACKGROUND ART

With the popularity of LED technology, more and more LED lights are used in people's life. Currently on the market, almost all wireless dimming and color temperature adjusting remote controllers employ radio frequency control technology, which has a weak anti-interference ability, networking inconvenience, mediocre reliability, and cannot achieve scenario modes, music-controlling colors, and other functions. Moreover, in conventional art, there is a technical bottleneck in integrating the lighting function of the light and the Bluetooth communication function.

SUMMARY

An object of the present disclosure is to provide a Bluetooth remote controller to solve the problems that are the difficulty of realizing a remote diversification operation of the lights, the technical bottleneck in integrating the lighting function of the light and the Bluetooth communication function in conventional art.

The technical solution of the present disclosure is implemented as follows.

The present disclosure provides a Bluetooth remote controller, comprising a remote controller housing which is provided with a plurality of openings, a circuit board disposed inside the remote controller housing, a plurality of keys disposed in the plurality of openings, a control unit disposed on the circuit board;

a key circuit electrically connected to the control unit and disposed on the circuit board and abutting on the plurality of keys, an antenna for sending and receiving a remote control signal of Bluetooth, electrically connected to the control unit and disposed on the circuit board.

The Bluetooth remote controller of the present disclosure further comprises a battery compartment disposed inside the remote controller housing and electrically connected to the control unit.

In the Bluetooth remote controller of the present disclosure, the plurality of keys of the present disclosure comprise a turn-on key, a turn-off key, an brightness enhancing key, a brightness reducing key, an color temperature increasing key, a color temperature decreasing key, an R component increasing key, an R component decreasing key, an G component increasing key, a G component decreasing key, a B component increasing key, a B component decreasing key, an RGB forward cyclic change key, an RGB backward cyclic change key.

In the Bluetooth remote controller of the present disclosure, the brightness enhancing key, the brightness reducing key, the color temperature key increasing and the color temperature decreasing key are disposed on a surface of the remote controller housing and from an annulus.

The Bluetooth remote controller of the present disclosure further comprises an indicator light, the indicator light is electrically connected to the control unit, is disposed in the center of the annulus, and abuts against the inner wall of the remote control housing.

The Bluetooth remote controller of the present disclosure further comprises a battery detection circuit for detecting the presence of a battery, and the battery detection circuit is electrically connected to the control unit and disposed on the circuit board.

In the Bluetooth remote controller of the present disclosure, the key circuit comprises a plurality of key switches; a position of the plurality of key switches and a position of the plurality of keys have a one-to-one correspondence.

The Bluetooth remote controller of the present disclosure further comprises a crystal oscillator for providing a reference signal, which is electrically connected to the control unit and disposed on the circuit board.

Therefore, the beneficial effects of the present disclosure is achieving functions such as the remote adjusting of brightness, remote adjusting of color, timing, colors changing along with music and setting profiles through Bluetooth wireless control technology to facilitate people's life and increase the diversity and delight of intelligent home lighting.

BRIEF DESCRIPTION OF THE DRAWINGS

The present disclosure will be further described with reference to the accompanying drawings and embodiments, and in the accompanying drawings.

DETAILED DESCRIPTION

For a clearer understanding of the technical features, objectives and effects of the present disclosure, the specific embodiments of the present disclosure will be described in detail below with reference to the accompanying drawings. It should be understood that the following descriptions are merely specific descriptions of the embodiments of the present disclosure, and should not be used to limit the protection scope of the present disclosure.

The present disclosure provides a Bluetooth remote controller 100 to achieve functions of networking freely through Bluetooth control technology, and achieve the ability to remotely control functions such as adjusting the brightness, the color and colors changing along with the music by a remote controller through a terminal intelligent remote controller, which meets different people's need, and is of high operability and good experience.

Figure 1:
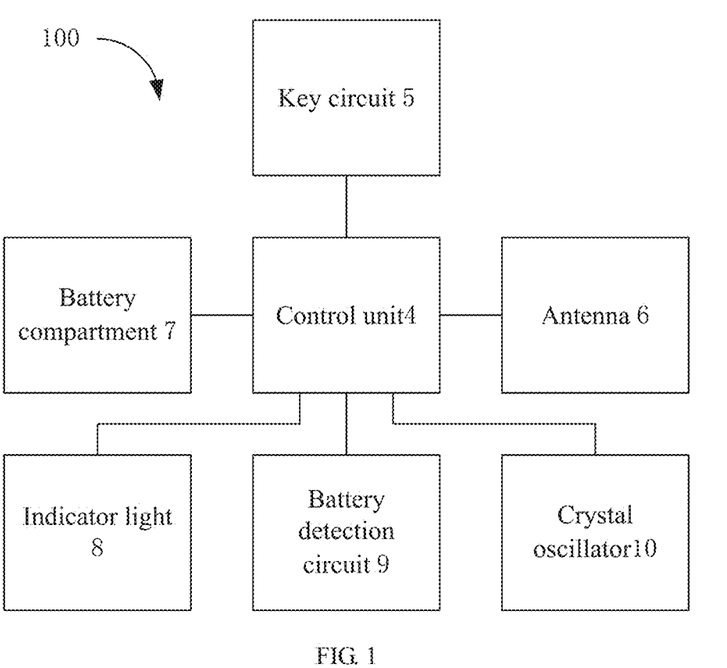
FIG. 1 is a module block diagram of a Bluetooth remote controller provided by the present disclosure.

Referring to FIG. 1, which is a module block diagram of a Bluetooth remote controller 100 provided by the present disclosure, an inside circuit of the Bluetooth remote controller 100 comprises a control unit 4, a key circuit 5, an antenna 6, a battery compartment 7, an indicator light 8, a battery detection circuit 9 and a crystal oscillator 10. Besides, the Bluetooth remote controller 100 further comprises a remote controller housing 1, a circuit board 2 and a plurality of keys 3.

Figure 2:
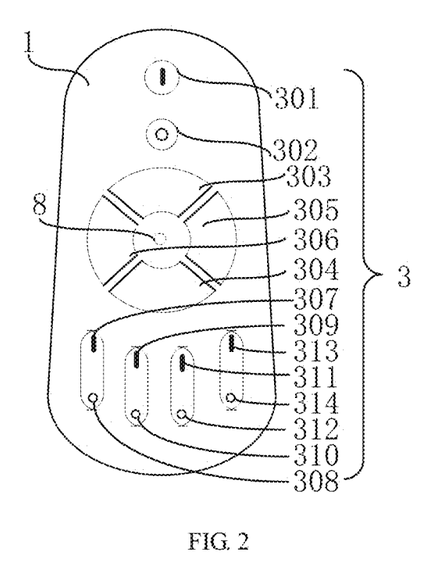
FIG. 2 is a schematic diagram of layout of a remote controller housing and keys provided by the present disclosure.

The Bluetooth remote controller 100 comprises the remote controller housing 1 in which a plurality of openings is formed. Referring to FIG. 2, which is a schematic diagram of layout of a remote controller housing and keys 3 provided by the present disclosure, the remote controller housing 1 has an oval shape, and a plurality of keys 3 are set on the front surface of the remote controller housing 1.

The Bluetooth remote controller 100 comprises the plurality of keys 3 disposed in the plurality of openings. Referring to FIG. 2, the plurality of keys 3 comprise a turn-on key 301, a turn-off key 302, an brightness enhancing key 303, a brightness reducing key 304, an color temperature increasing key 305, a color temperature decreasing key 306, an R component key increasing 307, an R component decreasing key 308, an G component increasing key 309, a G component decreasing key 310, an B component increasing key 311, a B component key decreasing 312, an RGB forward cyclic change key 313, an RGB backward cyclic change key 314. The brightness enhancing key, the reducing brightness key, the color temperature increasing key and the color temperature decreasing key are disposed on a surface of the remote controller housing and from an annulus.

Functions of the plurality of keys 3 are respectively as follow:

1. The turn-on key 301/the turn-off key 302: turning lights on and turning lights off.

2. The brightness enhancing key 303/the brightness reducing key 304: adjusting brightness from 5% to 100% and adjusting brightness from 100% to 5%.

3. The color temperature increasing key 305/the color temperature decreasing key 306: changing color temperature between warm white and cold white.

4. The R component increasing key 307/the R component decreasing key 308: when the increasing key is pressed, red lights are enhanced; otherwise, red lights are reduced.

5. The G component increasing key 309/the G component decreasing key 310: when the increasing key is pressed, green lights are enhanced; otherwise, green lights are reduced 6. The B component increasing key 311/the B component decreasing key 312: when the increasing key is pressed, blue lights are enhanced; otherwise, blue lights are reduced.

7. The RGB forward cyclic change key 313/the RGB backward cyclic change key 314: when forward cyclic change key is pressed continuously, the light colors change from R-G-B gradually. When the light gradually changes to desired color, release key 3, the current color is displayed. When the backward cyclic change key is pressed, colors are cyclically changed in reverse with the above order.

A total of 12 colors can be displayed. Displayed colors in turn for reference are red, orange, yellow, light green, green, indigo, cyan-blue, light blue, blue, purple, pink, rose red which are 12 kinds of gradient colors. When the backward cyclic change key is pressed each time, color of light changes to the next one, and so on.

8. When the key 3 is pressed each time, the indicator light 8 flashes one time, showing that an instruction has been sent. When the key 3 is pressed and the indicator light 8 does not react, the buttery should be replaced in time.

Figure 3:
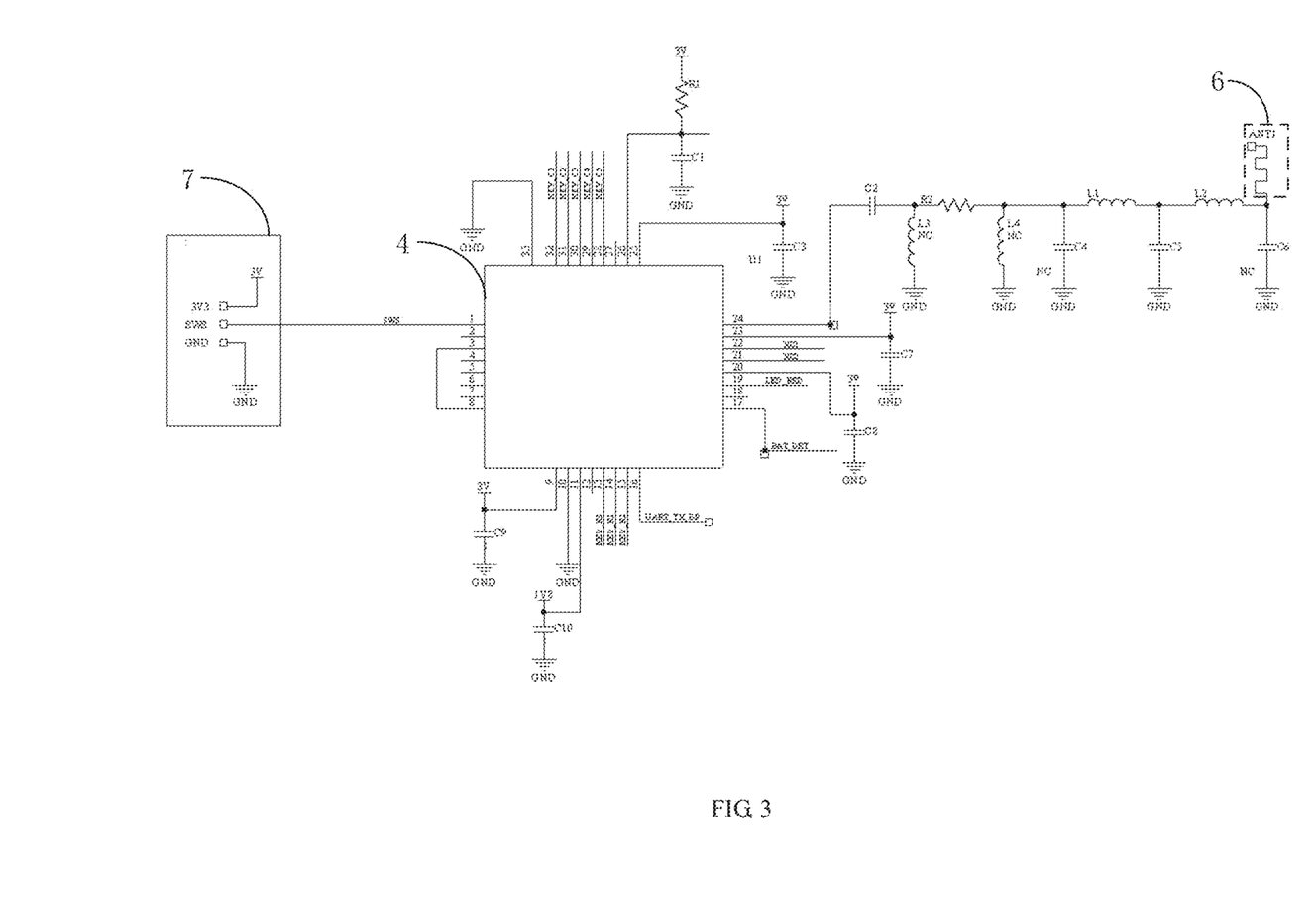
FIG. 3 is a schematic structural view of a control unit provided by the present disclosure.

The Bluetooth remote controller 100 comprises the control unit 4 disposed on the circuit board 2. The control unit 4 preferably is TLSR8266. Referring to FIG. 3, which is a schematic structural view of a control unit 4 provided by the present disclosure, an antenna 6 and a battery compartment 7 connecting to the control unit 4 are further comprised. The antenna 6 for receiving a remote control signal of Bluetooth, electrically connected to the control unit 4 and disposed on the circuit board 2. The antenna 6 connects to a (ANT) end 24 of TLSR8266. The battery compartment 7 is disposed inside the remote controller housing 1 and electrically connected to the control unit 4. The battery compartment 7 connects to a (SWS) end 1 of TLSR8266. Among them, battery compartment 7 can accommodate two AAA batteries to get 3V voltage.

Figure 4:
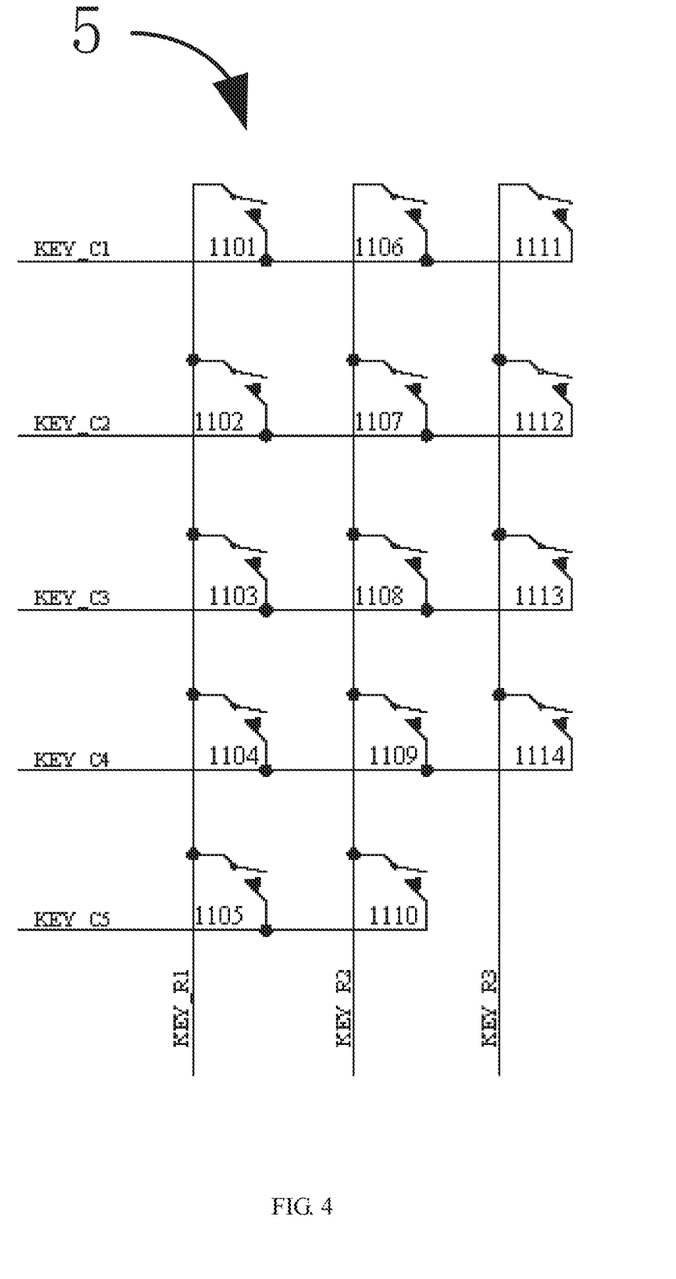
FIG. 4 is a schematic structural view of a key circuit provided by the present disclosure.

The Bluetooth remote controller 100 comprises a key circuit 5 electrically connected to the control unit 4 and disposed on the circuit board 2 and abutting on the plurality of keys 3. Referring to FIG. 4, which is a schematic structural view of the key circuit 5 provided by the present disclosure, a KEY C1 of the key circuit 5 connects to an end 32 of TLSR8266. A KEY C2 of the key circuit 5 connects to an end 31 of TLSR8266. A KEY C3 of the key circuit 5 connects to an end 30 of TLSR8266. A KEY C4 of the key circuit 5 connects to an end 29 of TLSR8266. A KEY C5 of the key circuit 5 connects to an end 28 of TLSR8266. A KEY R1 of the key circuit 5 connects to an end 14 of TLSR8266. A KEY R2 of the key circuit 5 connects to an end 15 of TLSR8266. A KEY R3 of the key circuit 5 connects to an end 13 of TLSR8266.

Figure 5:
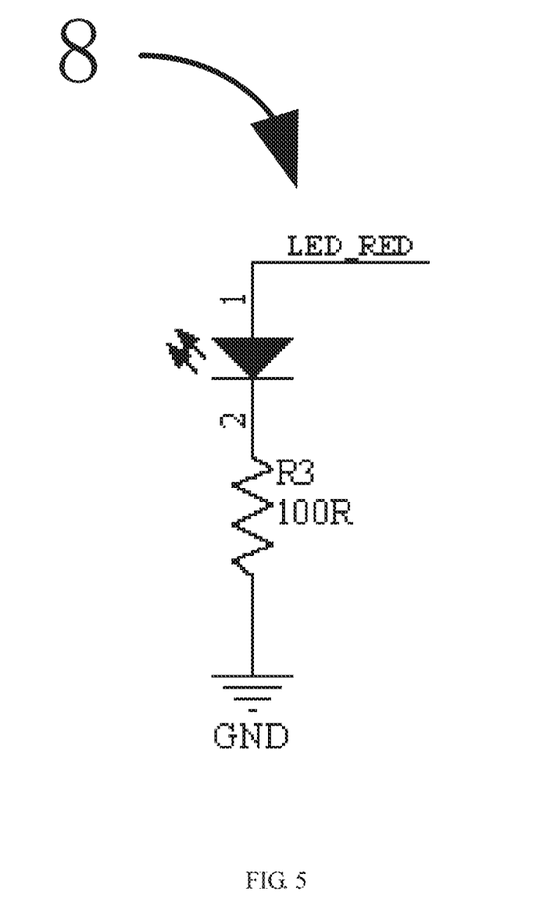
FIG. 5 is a schematic structural view of an indicator light provided by the present disclosure.

The Bluetooth remote controller 100 comprises an indicator light 8 electrically connected to the control unit 4, the indicator light 8 is disposed in the center of the annulus, and abuts against the inner wall of the remote control housing 1. Referring to FIG. 5, which is a schematic structural view of the indicator light 8, the indicator light 8 connects to a (LED RED) end 19 of TLSR8266. In addition, as shown in FIG. 2, as the indicator light 8 abuts against the inner wall of the remote control housing 1, it is not disposed on the surface of the remote control housing, so the indicator light 8 is indicated by dotted lines.

Figure 6:
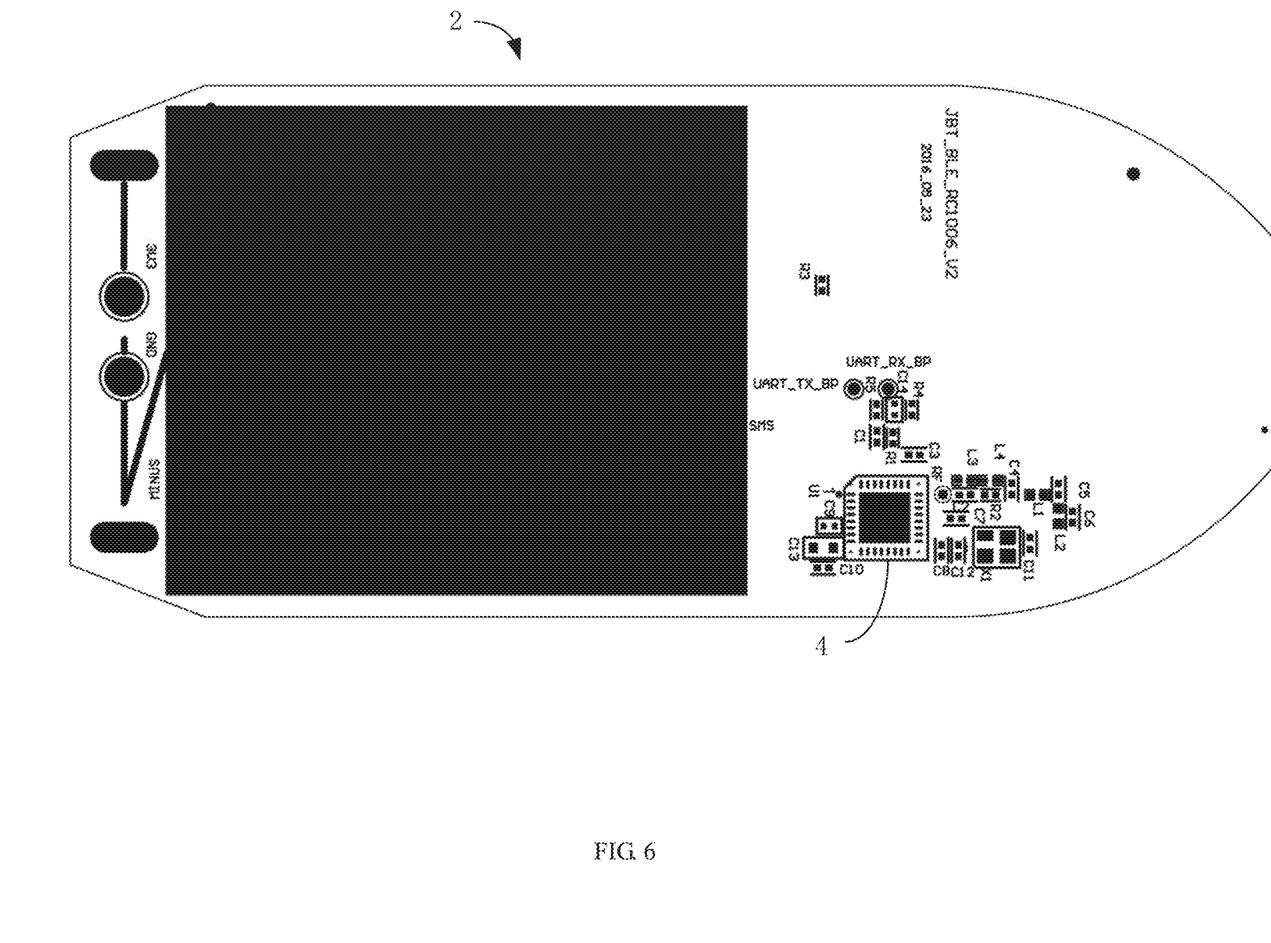
FIG. 6 is a schematic structural view of the back of a circuit board provided by the present disclosure.
Figure 7:
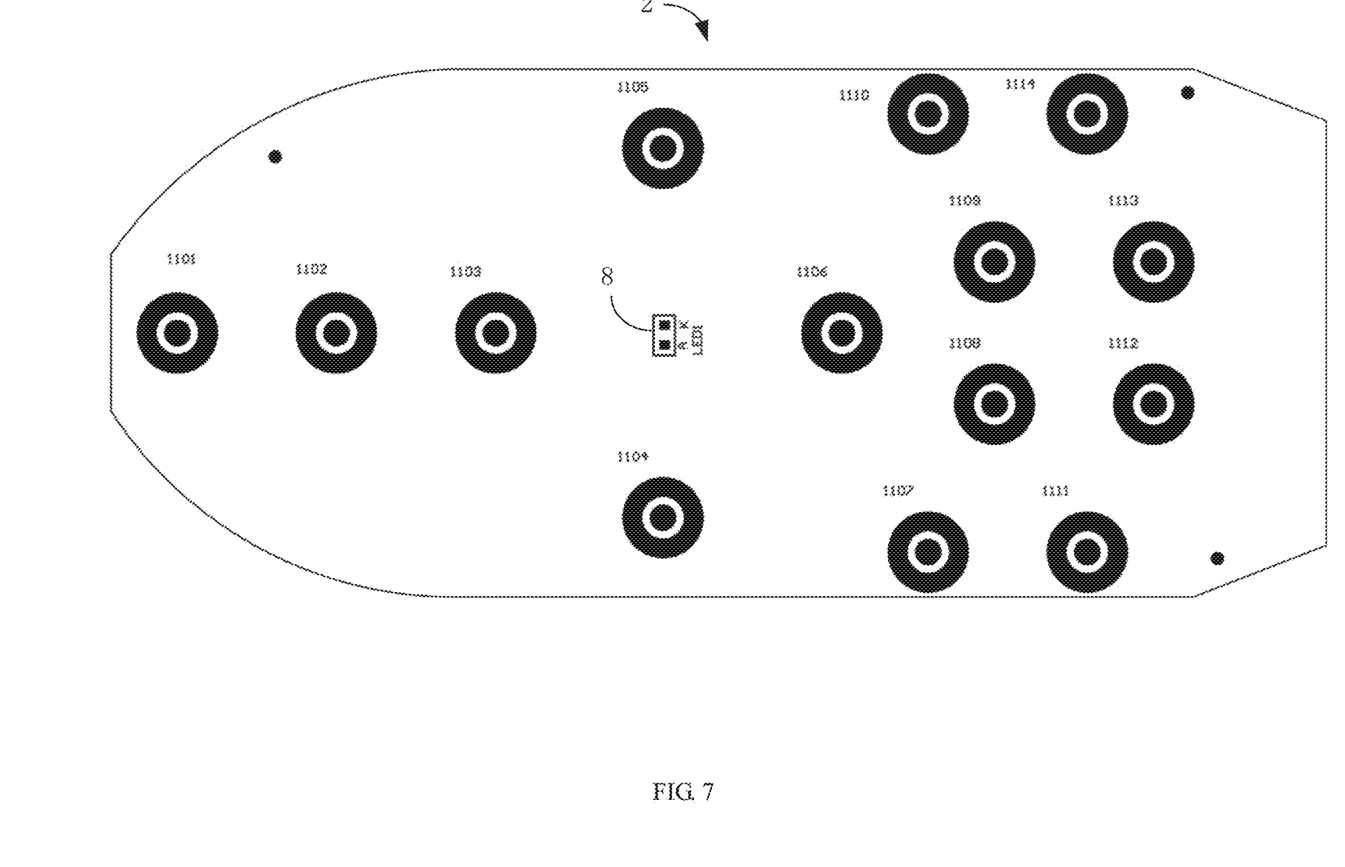
FIG. 7 is a schematic structural view of the front of a circuit board provided by the present disclosure.

The Bluetooth remote controller 100 comprises a circuit board 2 disposed inside the remote controller housing 1. Referring to FIG. 6 which is a schematic structural view of the back of a circuit board 2 provided by the present disclosure and FIG. 7 which is a schematic structural view of the front of the circuit board 2 provided by the present disclosure. In FIG. 6, the control unit 4 is disposed on the backside of the circuit board 2. In FIG. 7, a plurality of keys 3 are disposed on the circuit board 2, and have a one-to-one correspondence with the plurality of keys 3. That is to say, the key circuit 5 comprises a plurality of key switches 3, whose position have a one-to-one correspondence with the plurality of keys 3. For instance, a switch 1101 is corresponding with position 1101 of key 3, and so on.

Figure 8:
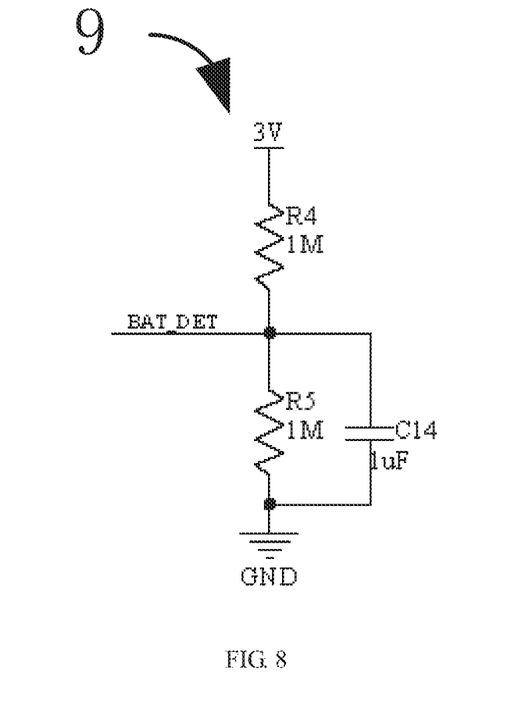
FIG. 8 is a schematic structural view of a battery detection circuit provided by the present disclosure.

The Bluetooth remote controller 100 comprises a battery detection circuit 9 for detecting the presence of a battery, and the battery detection circuit 9 is electrically connected to the control unit 4 and disposed on the circuit board 2. Referring to FIG. 8, which is a schematic structural view of a battery detection circuit provided by the present disclosure, the battery detection circuit 9 connects to a (BAT DET) end 17 of TLSR8266.

Figure 9:
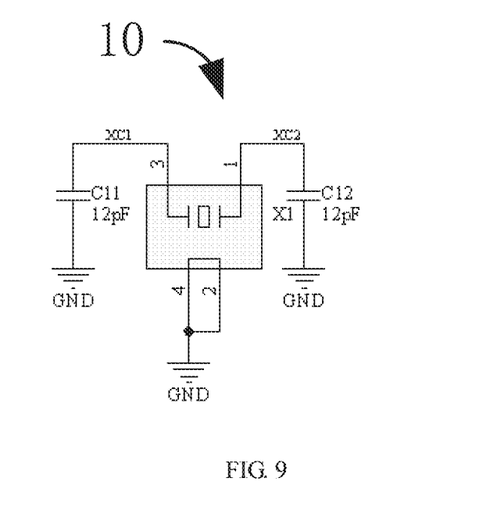
FIG. 9 is a schematic structural view of a crystal oscillator provided by the present disclosure.

The Bluetooth remote controller 100 comprises a crystal oscillator 10 for providing a reference signal, and the crystal oscillator 10 is electrically connected to the control unit 4 and disposed on the circuit board 2. Referring to FIG. 9 which is a schematic structural view of a crystal oscillator 10 provided by the present disclosure, the crystal oscillator 10 connects to a (XC2) end 21 and a (XC1) end 22 of TLSR8266.

Various operations of the embodiments are provided herein. In one embodiment, one or the described operations may constitute one or computer-readable instructions stored in a computer-readable medium that, when executed by an electronic device, will cause the computing device to perform the described operations. The order in which some or all of the operations are described should not be construed as to imply that the operations must be order dependent. Those skilled in the art will understand an alternative ordering that has the benefit of this description. Moreover, it should be understood that not all operations need to be present in every embodiment provided herein.

Moreover, the term "preferred" as used herein is intended to serve as an example, embodiment, or illustration. Any aspect or design described as "preferred" need not be construed as advantageous over other aspects or designs. In contrast, the use of the term "preferred" is intended to provide concepts in a concrete manner. The term "or" as used in this application is intended to mean an inclusive "or" rather than an exclusive "or." That is, unless specified otherwise or clear from the context, "X employs A or B" means naturally include any one of the permutations. That is. "X using A or B" is satisfied in any of the foregoing examples if X uses A; X uses B; or X uses both A and B.

Moreover, while the disclosure has been shown and described with respect to one or more implementations, those skilled in the art will readily recognize that modifications and adaptations are based on a reading and understanding of the specification and drawings. The disclosure includes all such modifications and variations, and is limited only by the scope of the claims. In particular regard to the various functions performed by the above described components (e.g., elements, resources, etc.), the terms used to describe such components are intended to correspond with the specified functions (e.g., that are functionally equivalent) that perform the components. Any of the components, unless otherwise indicated, are structurally identical to the disclosed structure that performs the functions in the exemplary implementations of the present disclosure shown herein. In addition, while a particular feature of the disclosure may have been disclosed with respect to only one of several implementations, such feature may be other than one or other features of other implementations as may be desirable and advantageous for a given or particular application combination. Also, to the extent that the terms "include". "have". "comprise" or variations thereof are used in either the detailed description or the claims, such terms are intended to be inclusive in a similar manner to the term "comprising."

In summary, although the present disclosure has been disclosed by the preferred embodiments, the above preferred embodiments are not intended to limit the present disclosure. Those skilled in the art may make various modifications without departing from the spirit and scope of the present disclosure. Therefore, the protection scope of the present disclosure is subject to the scope defined by the claims.

What is claimed is:

1. A Bluetooth remote controller, comprising:
   a remote controller housing provided with a plurality of openings;
   a circuit board disposed inside the remote controller housing;
   a plurality of keys disposed in the plurality of openings;
   a control unit disposed on the circuit board;
   an indicator light surrounded by a brightness enhancing key, a brightness reducing key, a color temperature increasing key, and a color temperature decreasing key, the indicator light abutting against an inner wall of the remote controller housing and not disposed on a surface of the remote controller housing;
   a key circuit electrically connected to the control unit and disposed on the circuit board, the key circuit abutting the plurality of keys; and
   an antenna for receiving a remote control signal of Bluetooth, electrically connected to the control unit and disposed on the circuit board,
   wherein the plurality of keys comprises the brightness enhancing key, the brightness reducing key, the color temperature increasing key, the color temperature decreasing key, an R component increasing key, an R component decreasing key, a G component increasing key, a G component decreasing key, a B component increasing key, a B component decreasing key, an RGB forward cyclic change key, and an RGB backward cyclic change key, each of the plurality of keys is an individual key,
   wherein the RGB forward cyclic change key is configured to change colors in an order of R-G-B, the RGB backward cyclic change key is configured to change colors in an order of B-G-R,
   wherein when one of the plurality of keys is pressed, the indicator light is configured to flash to indicate an instruction being sent, or configured to not react to indicate a battery replacement.

2. The Bluetooth remote controller of claim 1, further comprising a battery compartment disposed inside the remote controller housing and electrically connected to the control unit.

3. A Bluetooth remote controller, comprising:
   a remote controller housing provided with a plurality of openings;
   a circuit board disposed inside the remote controller housing;
   a plurality of keys disposed in the plurality of openings;
   a control unit disposed on the circuit board;
   an indicator light surrounded by a brightness enhancing key, a brightness reducing key, a color temperature increasing key, and a color temperature decreasing key, the indicator light abutting against an inner wall of the remote controller housing and not disposed on a surface of the remote controller housing;
   a key circuit electrically connected to the control unit and disposed on the circuit board, the key circuit abutting the plurality of keys; and
   an antenna for receiving a remote control signal of Bluetooth, electrically connected to the control unit and disposed on the circuit board,
   wherein the plurality of keys comprises a turn-on key, a turn-off key, the brightness enhancing key, the brightness reducing key, the color temperature increasing key, the color temperature decreasing key, an R component increasing key, an R component decreasing key, a G component increasing key, a G component decreasing key, a B component increasing key, a B component decreasing key, an RGB forward cyclic change key, and an RGB backward cyclic change key, each of the plurality of keys is an individual key, wherein the RGB forward cyclic change key is configured to change colors in an order of R-G-B, the RGB backward cyclic change key is configured to change colors in an order of B-G-R, wherein when one of the plurality of keys is pressed, the indicator light is configured to flash to indicate an instruction being sent, or configured to not react to indicate a battery replacement.

4. The Bluetooth remote controller of claim 3, wherein the enhancing brightness key, the brightness reducing key, the increasing color temperature key and the decreasing color temperature key are disposed on the surface of the remote controller housing and form an annulus.

5. The Bluetooth remote controller of claim 4, the indicator light is electrically connected to the control unit and is disposed in the center of the annulus.

6. The Bluetooth remote controller of claim 1, further comprising a battery detection circuit for detecting a presence of a battery, wherein the battery detection circuit is electrically connected to the control unit and disposed on the circuit board.

7. The Bluetooth remote controller of claim 1, wherein the key circuit comprises a plurality of key switches, a position of the plurality of key switches and a position of the plurality of keys have a one-to-one correspondence.

8. The Bluetooth remote controller of claim 1, further comprising a crystal oscillator for providing a reference signal, wherein the crystal oscillator is electrically connected to the control unit and disposed on the circuit board.

9. The Bluetooth remote controller of claim 3, further comprising:
a battery compartment disposed inside the remote controller housing and electrically connected to the control unit.

10. The Bluetooth remote controller of claim 3, further comprising:
a battery detection circuit for detecting a presence of a battery,
wherein the battery detection circuit is electrically connected to the control unit and disposed on the circuit board.

11. The Bluetooth remote controller of claim 3, wherein the key circuit comprises a plurality of key switches,
a position of the plurality of key switches and a position of the plurality of keys have a one-to-one correspondence.

12. The Bluetooth remote controller of claim 3, further comprising a crystal oscillator for providing a reference signal,
wherein the crystal oscillator is electrically connected to the control unit and disposed on the circuit board.

13. A Bluetooth remote controller, comprising:
a remote controller housing provided with a plurality of openings;
a circuit board disposed inside the remote controller housing;
a plurality of keys disposed in the plurality of openings;
a control unit disposed on the circuit board;
an indicator light surrounded by a brightness enhancing key, a brightness reducing key, a color temperature increasing key, and a color temperature decreasing key, the indicator light abutting against an inner wall of the remote controller housing and not disposed on a surface of the remote controller housing;
a key circuit electrically connected to the control unit and disposed on the circuit board, the key circuit abutting the plurality of keys; and
an antenna for receiving a remote control signal of Bluetooth, electrically connected to the control unit and disposed on the circuit board,
wherein the plurality of keys comprises the brightness enhancing key, the brightness reducing key, the color temperature increasing key, the color temperature decreasing key, an R component increasing key, an R component decreasing key, a G component increasing key, a G component decreasing key, a B component increasing key, a B component decreasing key, an RGB forward cyclic change key, and an RGB backward cyclic change key,
the key circuit comprises a plurality of key switches,
a position of the plurality of key switches and a position of the plurality of keys have a one-to-one correspondence, each of the plurality of keys is an individual key,
wherein the RGB forward cyclic change key is configured to change colors in an order of R-G-B, the RGB backward cyclic change key is configured to change colors in an order of B-G-R,
wherein when one of the plurality of keys is pressed, the indicator light is configured to flash to indicate an instruction being sent, or configured to not react to indicate a battery replacement.

14. The Bluetooth remote controller of claim 13, further comprising:
a battery compartment disposed inside the remote controller housing and electrically connected to the control unit.

15. The Bluetooth remote controller of claim 13, further comprising:
a battery detection circuit for detecting a presence of a battery,
wherein the battery detection circuit is electrically connected to the control unit and disposed on the circuit board.

16. The Bluetooth remote controller of claim 13, further comprising:
a crystal oscillator for providing a reference signal,
wherein the crystal oscillator is electrically connected to the control unit and disposed on the circuit board.

17. The Bluetooth remote controller of claim 3, wherein the brightness enhancing key is configured to adjust brightness from 5% to 100%, the brightness reducing key is configured to adjust brightness from 100% to 5%, and the color temperature increasing key and the color temperature decreasing key are configured to change color temperature between warm white and cold white.

18. The Bluetooth remote controller of claim 3, wherein the brightness enhancing key, the brightness reducing key, the color temperature increasing key, and the color temperature decreasing key are individual keys separate from each other and form a circle around the indicator light.

19. The Bluetooth remote controller of claim 3, wherein the colors changed by the RGB forward cyclic change key and the RGB backward cyclic change key are in an order of red, orange, yellow, light green, green, indigo, cyan-blue, light blue, blue, purple, pink, and rose red.

20. The Bluetooth remote controller of claim 3, wherein the control unit is disposed on a backside of the circuit board, the key circuit having a plurality of key switches, and the plurality of key switches electrically connected to a plurality of ends of the control unit, respectively.

* * * * *